United States Patent [19]

Dickerson

[11] Patent Number: 5,433,854
[45] Date of Patent: Jul. 18, 1995

[54] METHOD FOR PREVENTING EROSION IN WASTE WATER LIFT STATIONS AND TREATMENT FACILITIES

[76] Inventor: J. Rodney Dickerson, P.O. Box 80132, Lafayette, La. 70598-0132

[21] Appl. No.: 213,597

[22] Filed: Mar. 16, 1994

[51] Int. Cl.⁶ .......................... C02F 1/78; C02F 3/02
[52] U.S. Cl. ................................ 210/620; 210/760; 210/764; 210/170; 210/192; 210/916
[58] Field of Search .............. 210/192, 760, 764, 916, 210/170, 620, 209, 218

[56] References Cited

U.S. PATENT DOCUMENTS

| | | | |
|---|---|---|---|
| 2,970,821 | 2/1961 | Axt | 210/760 |
| 3,335,082 | 8/1967 | Ullrich | 210/620 |
| 3,445,001 | 5/1969 | LaRaus | 210/760 |
| 3,525,685 | 8/1970 | Edwards | 210/620 |
| 3,674,216 | 7/1972 | Blair | 241/18 |
| 3,734,850 | 5/1973 | Karr | 210/220 |
| 3,756,410 | 9/1973 | Moody et al. | 210/192 |
| 3,772,188 | 11/1973 | Edwards | 210/760 |
| 3,957,633 | 5/1976 | Gatti et al. | 210/220 |
| 4,115,258 | 9/1978 | Smith et al. | 210/620 |
| 4,148,726 | 4/1979 | Smith | 210/620 |
| 4,172,786 | 10/1979 | Humphrey et al. | 210/57 |
| 4,250,040 | 2/1981 | LaRaus | 210/760 |
| 4,412,924 | 11/1983 | Feather | 210/760 |
| 4,552,659 | 11/1985 | Tabata et al. | 210/192 |
| 4,555,335 | 11/1985 | Burris | 210/192 |
| 4,654,144 | 3/1987 | Sharkey et al. | 210/631 |
| 4,696,740 | 9/1987 | Mochizuki et al. | 210/192 |
| 4,997,571 | 3/1991 | Roensch et al. | 95/263 |
| 5,032,292 | 7/1991 | Conrad | 210/764 |
| 5,078,965 | 1/1992 | Pearson | 210/760 |

FOREIGN PATENT DOCUMENTS

| | | |
|---|---|---|
| 0361385 | 4/1990 | European Pat. Off. . |
| 53-42438 | 4/1978 | Japan . |
| 64-56124 | 3/1989 | Japan . |
| 2-258015 | 10/1990 | Japan . |

Primary Examiner—Cynthia L. Nessler
Attorney, Agent, or Firm—William David Kiesel; Robert C. Tucker

[57] ABSTRACT

A method of removing noxious odors and preventing erosion within waste water enclosures is provided comprising the step of administering a flow of ozonated air into a vapor space above the level of the waste water in the enclosure, wherein the volume of the ozonated air and the concentration of ozone in the ozonated air are sufficient to prevent the formation of biofilm on the ceiling and walls of the enclosure. The method is intended to produce a blanket of non-turbulent, ozonated air directly above the surface of the waste water so that escaping undesirable chemicals, such as hydrogen sulfide, are caused to fully react with the ozone. The reaction with ozone minimize odors emanating from the enclosure and it deprives the bacteria forming the biofilm of the chemicals needed to sustain them. Residual, unreacted ozone also serves to eliminate the biofilm by directly reacting with the bacteria within the enclosure.

13 Claims, 3 Drawing Sheets

METHOD FOR PREVENTING EROSION IN WASTE WATER LIFT STATIONS AND TREATMENT FACILITIES

BACKGROUND OF THE INVENTION

1. Field of the Invention

The present invention relates generally to the use of ozone as a bactericide, and more particularly to the use of ozone in inhibiting the formation of a biofilm on the interior surfaces of waste water lift stations, treatment facilities and the like to prevent erosion.

2. Description of Prior Art

Ozone is well known for its ability to destroy odors, especially those generated by sewage treatment facilities, distilleries, paper mills, and many other industrial processes, because it is highly reactive with most elements. The more common odors which must be controlled are those caused by organic nitrogen- and sulfur-containing substances, particularly skatole, methyl disulfide, hydrogen sulfide, dimethyl sulfide, methyl mercaptan, putrescine, and cadaverine. The reaction between effective amounts of ozone and these noxious gases substantially reduces the objectionable qualities of the surrounding air. Ozone is also known to be an effective bactericide, capable of killing most types of bacteria present in waste water treatment facilities.

Sewer lift stations and treatment facilities are often the source of such malodorous gases, because they serve as a local repository of sewage and other waste which is produced from the surrounding community. These lift stations collect sewage and waste water from a multitude of sources into a large holding tank, and a lift pump delivers the waste to a higher level so that it can flow into subsequent lift stations or to an appropriate wastewater treatment facility. Since the lift pump is designed not to operate until the level in the holding tank reaches a predetermined level, the waste in the lift station may become very septic over a period of time. This condition has previously been thought totally responsible for the noxious odors which emanate from the lift stations.

Lift stations and wet wells, particularly those constructed of concrete, also suffer from erosion of the roof and walls, which conventional thinking believes to be caused by the effects of hydrogen sulfide gas emitted by the septic waste. The erosion occurs primarily as a softening of the structure in various areas until the concrete "melts" away, leaving holes in the roof, especially in the corners. Efforts to alleviate such erosion have focused on the elimination of hydrogen sulfide in the air space above the liquid under the assumption that it alone caused the formation of acids. Other explanations have theorized that differences in concrete composition and consistency render certain structures more vulnerable than others to such chemicals. Most importantly, this same type of erosion has been observed in varying degrees when the construction material was plastic, fiberglass, or concrete coated with a protective material supposedly resistant to hydrogen sulfide attack.

Various methods have been used in the prior art to cause ozone to react with these gases in an attempt to eliminate the objectionable odors and prevent further erosion, both problems being attributed to the presence of hydrogen sulfide. One such method involves the bubbling of ozone-enriched air into the liquid phase of the sewage or waste water, wherein the concentration of ozone is about 0.5% or greater by weight. This method is sometimes referred to as "wet oxidation" and requires very large dosages of ozone, typically in the range of a pound or more of ozone per day even in small applications. One disadvantage is that such high concentrations result in substantial equipment and operating costs. Another disadvantage is that a substantial portion of unreacted ozone accumulates in the vapor over the liquid, resulting in high levels of ozone which can cause excessive corrosion to the internal structures of the lift station and may even be released to the atmosphere in large amounts.

What is needed is a method for simultaneously destroying noxious odors and preventing erosion of the lift station interior by focusing on the real cause of erosion, namely the formation of biofilm on the roof and walls of the enclosure. In order to solve both these problems, as well as minimize the escape of unreacted ozone, a balance must be sought between the concentration of ozone in the air, the volume of ozone-enriched air administered into the enclosure, and the means by which the ozonated air is directed into the vapor space above the liquid. Once this is accomplished, erosion and noxious odors can successfully be eliminated from lift stations and related waste water treatment structures to a degree heretofore unknown in the prior art.

SUMMARY OF THE INVENTION

It is therefore an object of this invention to provide a method for preventing erosion in lift stations and related waste water treatment structures through the effective use of ozone to remove biofilm.

It is also an object of this invention to provide a method for preventing erosion in lift stations and related waste water treatment structures through the effective use of ozone to prevent the formation of biofilm.

It is a further object of this invention to provide a method for eliminating noxious odors from lift stations and related waste water treatment structures through the effective use of ozone.

These and other objects and advantages of the present invention will no doubt become apparent to those skilled in the art after having read the following description of the preferred embodiment which are contained in and illustrated by the various drawing figures.

Therefore, in a preferred embodiment, and in an enclosure for waste water, said enclosure including a holding tank, an inlet line, an outlet line, and a vent line; a method of removing noxious odors and preventing erosion within said enclosure, comprising the step of administering a flow of ozonated air into a vapor space above the level of said waste water in said enclosure, wherein the volume of said ozonated air and the concentration of ozone in said ozonated air are sufficient to prevent the formation of biofilm on said enclosure.

Also provided is an improved enclosure for waste water, comprising a holding tank, an inlet line, an outlet line, a vent line, and means operatively attached to said enclosure for administering a flow of ozonated air into a vapor space above the level of said waste water in said enclosure, wherein the volume of said ozonated air and the concentration of ozone in said ozonated air are sufficient to prevent the formation of biofilm on said enclosure.

DETAILED DESCRIPTION OF THE PREFERRED EMBODIMENT

Figure 1:
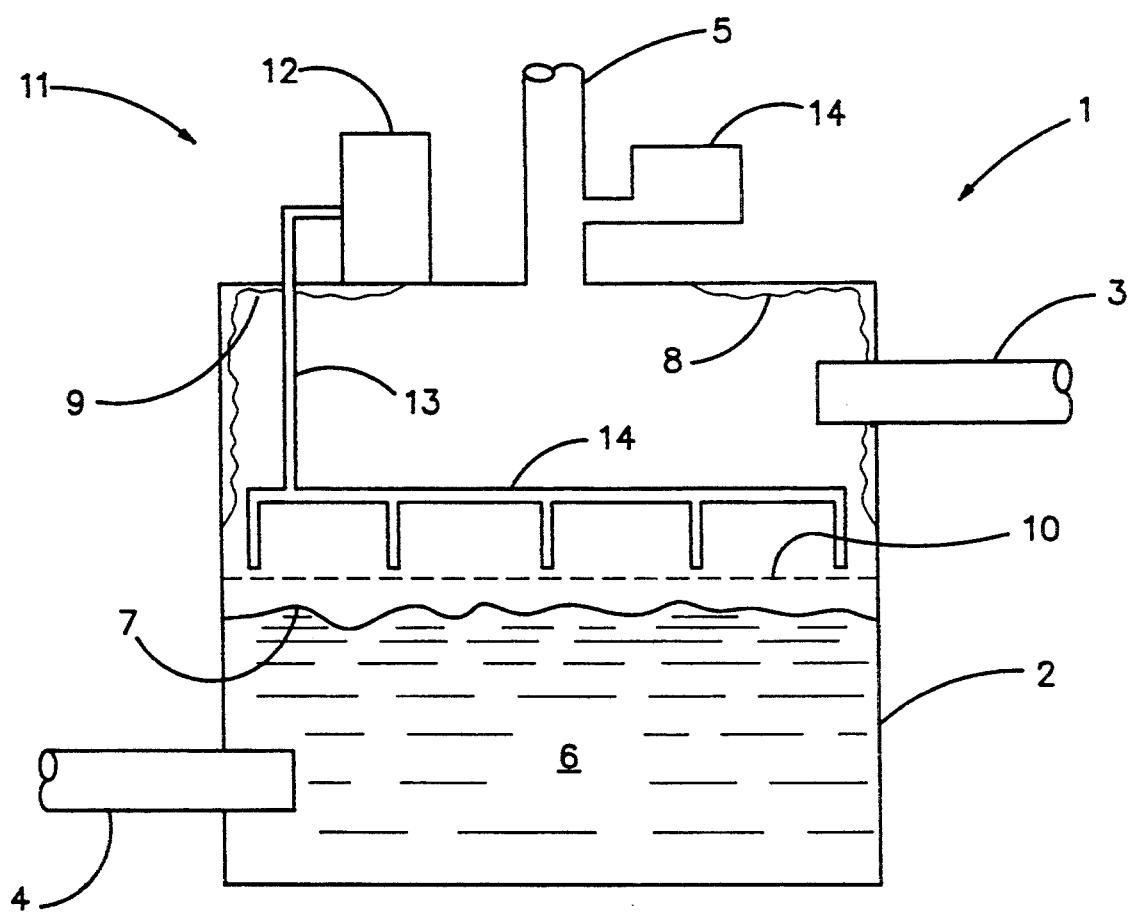
FIG. 1 is a sectional view of a lift station or wet well depicting the manner in which the ozone-enriched air is preferably administered into the vapor space above the liquid.

Turning now to FIG. 1, a lift station 1 is shown as having a holding tank 2, an inlet line 3, an outlet line 4, and a vent line 5. Waste water 6 is contained within holding tank 2 and has a liquid level 7. Over a period of time after operation of lift station 1 has begun, a biofilm 8 begins to form on the roof and walls of holding tank 2, especially at the corners 9. The bacteria which comprise the biofilm 8 most typically are in the form of slime and are nourished by the constant supply of nutrients derived from gases above waste water 6. Particularly, the bacteria use methane gas and hydrogen sulfide in their metabolism, resulting in the production of mercaptans. Mercaptans have an extremely foul odor, even at concentration levels of only a few parts per billion. These bacteria require calcium, silica and other elements in their bodies, and secret acidic enzymes to solubilize the material to which they adhere, typically concrete in most structures. The breakdown of the concrete allows the calcium and silica to be then assimilated into the bacteria. Over a period of about a month from the start-up of operations, this action results in the "softening" and erosion of the concrete seen in the interior roof and wall structures of the holding tank 2.

Because the odors typically associated with lift stations 1 and related sewage facilities are particularly offensive and occasionally nauseating, it is likely that the cause of the odors emanating from such lift stations 1 is most likely due to the production of mercaptans by the bacteria which form the biofilm 8, rather than due to the presence of hydrogen sulfide gas. Also, there is little evidence to support the conclusions reached by many in the art that the erosion is caused by a reaction between hydrogen sulfide and other chemicals to produce an eroding acid. Mistaken assumptions about the cause of both the odors and the erosion are what have driven the prior art away from a complete and effective solution to these problems.

The real cause of such problems would have become apparent if persons in the prior art would have observed and noted several seemingly unrelated events, especially in wet well structures. First, all attempts to prevent the buildup of hydrogen sulfide and methane gas have involved the injection of large quantities of air which, in turn, must be vented. This was mistakenly thought to only dilute the malodorous gases that evolved and carry them away from their source. The vented gases always had odor which was thought to be hydrogen sulfide alone. Scrubbers using caustic soda, and other chemicals were often installed to remove the hydrogen sulfide from the vent gas. In such instances, even with no hydrogen sulfide in the scrubbed gas, there were still some odors, and the wet well interior surfaces were still covered with slime or biomass.

Second, attempts to reduce the hydrogen sulfide levels on the liquid using oxidants, such as hydrogen peroxide, iron, salts, and enzymes still had no effect on the biofilm within the structure. Third, new structures first in operation usually took several weeks before odors became very noticeable. Even when low levels of hydrogen sulfide were maintained within the wet well by venting, erosion and some odor persisted. Prior art perceived odor and erosion as solely attributable to the effects of hydrogen sulfide. Therefore, the following techniques are provided to remedy the erosion and odor complications most often experienced in waste water lift stations and related equipment.

The applicant has discovered that prior art methods involving the injection of ozone-enriched air into the vapor space for odor control are ineffective, largely because the flow velocity of the air tends to strip odor-causing chemicals away from the surface of the liquid and cause them to be vented before they have a chance to react with the ozone. It is precisely this kind of difficulty that has led persons of ordinary skill in this field to prefer the "wet oxidation" process of bubbling the ozone through the liquid itself in an attempt to generate more reactions with undesirable chemicals. Therefore, it is important to the inventive method herein described that a quiescent "blanket" 10 of ozone-enriched air be formed across the surface of the waste water. Because the density of ozone is greater than air, it will naturally tend to sink and form such a blanket 10 if left relatively undisturbed.

All chemicals will exert a certain vapor pressure when in solution. In many instances it is very easy for chemicals to pass from the liquid solution to the gas. This process allows hydrogen sulfide in drinking water to be removed by air stripping. In that instance, a small volume of water is contacted with a large amount of air, thereby effectively removing the hydrogen sulfide from the water. This is commonly done on packed towers where the water flow is spread out over packing to give a high surface area for contact. Surface area is important because it is the window through which the chemicals pass between phases. Some of the factors that govern the rate at which a chemical passes from one phase to another are: (1) the total pounds of each phase, (2) the composition of each phase, and (3) the concentration of the chemical as it moves between the phases.

Figure 4:
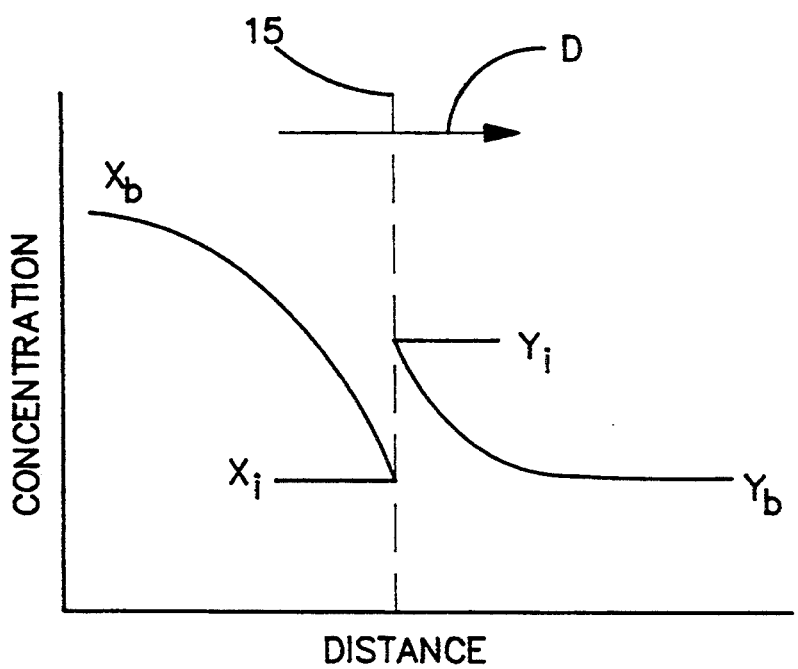
FIG. 4 is a graph which shows the general relationship between the concentration of undesirable chemicals at the liquid/air interface.

FIG. 4 is a diagram which depicts the general relationship between the concentration of hydrogen sulfide in the bulk liquid ($X_b$), in the bulk air ($Y_b$), and at the interface 15 between the liquid and the air ($X_i$ and $Y_i$, respectively) as gas is transferred from liquid to gas in direction D. This relationship assumes the presence of two mass transfer resistances and is commonly referred to as the "two film $\infty$ theory. The mathematical equations which describe this relationship can be found in several references, namely Perry's Handbook for Chemical Engineers. As previously explained, when strippers are used to remove such chemicals, large quantities of air are passed over the surface of the liquid to strip the chemicals away. The higher velocity of air at the surface tends to remove the greatest amount of chemicals from the liquid. Consequently, increasing the air flow will increase the rate of removal of gases from the wet well or similar waste water treatment facility. The disadvantage of higher air flows is that the ozone cannot react sufficiently with the chemicals. Therefore, it is necessary to balance the amount of ozone applied with the flow of air through the vapor space over a period of time.

It is possible to have greater concentrations of the malodorous chemicals in the vapor phase than in the liquid phase. However, with all other factors constant, the rate at which the transfer from the liquid to the vapor occurs will decline as the concentration in the vapor phase increases. Prior art, in an attempt to keep the accumulation of both hydrogen sulfide and methane gas at low levels within the wet wells and similar structures by diluting and venting with air, has actually turned the wet wells into air strippers. Conversely, those wet wells that were not force-vented, but naturally vented (all wet wells must be vented to operate), had small volumes of very foul air periodically emitted. In small stations in remote areas this was not judged a problem because it would rapidly dissipate and react with the low levels of ozone already present in the surrounding air at all times.

Therefore, the inventor of the present method has devised an ozone distribution system 11 comprising an ozone generating unit 12 situated preferably on top of the lift station 1, an intermediate conduit 13 in fluid communication with the unit 12, and a series of air outlets 14 in fluid communication with conduit 13. It is preferred that ozone generating unit 12 be of the corona discharge type, such as that manufactured under U.S. Pat. No. 4,909,996 to Mr. Richard Uys, but may also be any other appropriate generator capable of producing the ozone concentrations disclosed herein. Air outlets 14 are spaced apart such that a uniform flow of ozone-enriched air can be dispensed above liquid surface 7 to aid in forming ozone blanket 10.

The goal of the invention is to introduce just enough ozone to react with the malodorous gases without causing an unreacted ozone buildup in the vapor space above the liquid level 7. To some extent, achieving this goal involves some trial and error, and is highly dependent upon several factors described herein. However, the steps needed to achieve a balance between the introduction of necessary amounts of ozone and the minimization of the venting of unreacted ozone are straight forward.

First, unless the wet well of lift station is a totally new structure, a certain amount of ozone will be initially expended on destroying the biofilm 9 accumulation on the walls and ceiling. Once this is done, the total ozone demand in preventing further biofilm 9 formation and eliminating odors will be greatly reduced. Since it is not known what the total ozone demand will be, including the amount required to destroy the biofilm 9, a starting point is determined based upon the volume of the vapor space and past experience with the characteristics of a particular wet well or lift station.

If the volume of vapor space were constant, i.e. no change in liquid level 7, then under static conditions the amount of gases evolved into the vapor space would be a function of the composition of the waste water 6. However, liquid level 7 is constantly changing, as well as the composition of the waste water 6 coming into the wet well of lift station 1. Therefore, it is impossible to accurately determine the rate of evolution of gases with any precision. But, certain general estimations may be made as described below.

The concentration of hydrogen sulfide and other gases in the waste water 6 is usually less than five parts per million (ppm). Assuming the wet well 1 is generally rectangular in shape and uniform in dimension, the surface area of the liquid may be assumed to represent one side of a box. In most instances the sides of the "box", representing the vapor space, are six feet and larger. Therefore, the ratio of the surface area to the volume is typically between 1:6 and 1:10. If one assumes the amount of gas that can evolve must contact an equal amount of ozone for destruction, then the vapor space must be large enough to contain that amount of ozone.

For example, in a wet well having a horizontal area of 10 feet by 10 feet (10'×10') with 10 vertical feet (10') of vapor space, the liquid at the surface contains about 5 ppm of gas which can evolve. Therefore, the 10'×10' surface at a depth of about one foot (1') represents approximately 833 pounds of liquid with 0.004165 pounds of gas to evolve. The 1,000 cubic feet of vapor space contain approximately 76.5 pounds of air at ambient conditions. Hence, about 0.004165 pounds of ozone is needed in 76.5 pounds of air. This represents 54.44 ppm of ozone in the static volume of the vapor space.

The normal contact time for destruction of hydrogen sulfide, methane, mercaptans, carbon dioxide and carbon monoxide in the gas phase is about 2 to 60 seconds, depending on mixing, with shorter times in turbulent regions and longer times in open spaces without turbulence. To prevent undue turbulence within the vapor space, so that layering can occur in the formation of blanket 10, the complete displacement in the vapor space should be on the order of once every three to five minutes with longer times being preferable.

Additionally, the manner of introduction, particularly the velocity, of ozonated air entering the wet well 1 must be low to avoid excessive turbulence yet have gentle mixing and layering. The layering and the formation of blanket 10 occurs because ozone has an average molecular weight of 48, which is nearly double that of air.

In the example previously described, the 1000 cubic foot vapor space with an ozone demand of 0.004165 pounds introduced every five minutes, one would need approximately 200 cubic feet per minute of air with an ozone content of about 55 ppm. Since the flow of ozonated air is constant (and the flow of waste water is not), there are periods when there is an accumulation of ozone in the vapor space. This accumulation will be offset by high waste water flow periods.

Ideally, the ozone-enriched air should be injected into the vapor space immediately above the liquid level 7, but the constantly changing flow into and out of holding tank 2 render it difficult to focus the air outlets 14 in the optimum area without automating the vertical position of air outlets 14. Absent such automation, and through experimentation conducted by the inventor, it has been determined that the next most preferred location for the air outlets 14 is directly above the mean high water level of holding tank 2. This location assures proper settling of the ozone just above the liquid level 7.

In the quiescent zone, odor-causing chemicals are not stripped away by turbulence, but are instead allowed to react with appropriate concentrations of ozone within the blanket 10. Minimal air velocity prevents excessive amounts of ozone from escaping through vent line 5, while allowing residual amounts of ozone to rise higher into the vapor space to react with the biofilm 8. Through experimentation, the inventor has found that ozone concentrations as low as 0.1 parts per million (ppm) are effective in attacking the bacteria and reacting with the odiferous chemicals, but concentrations of at least 1.0 ppm are preferred.

The following examples illustrate some applications of the invention.

EXAMPLE 1

Figure 2:
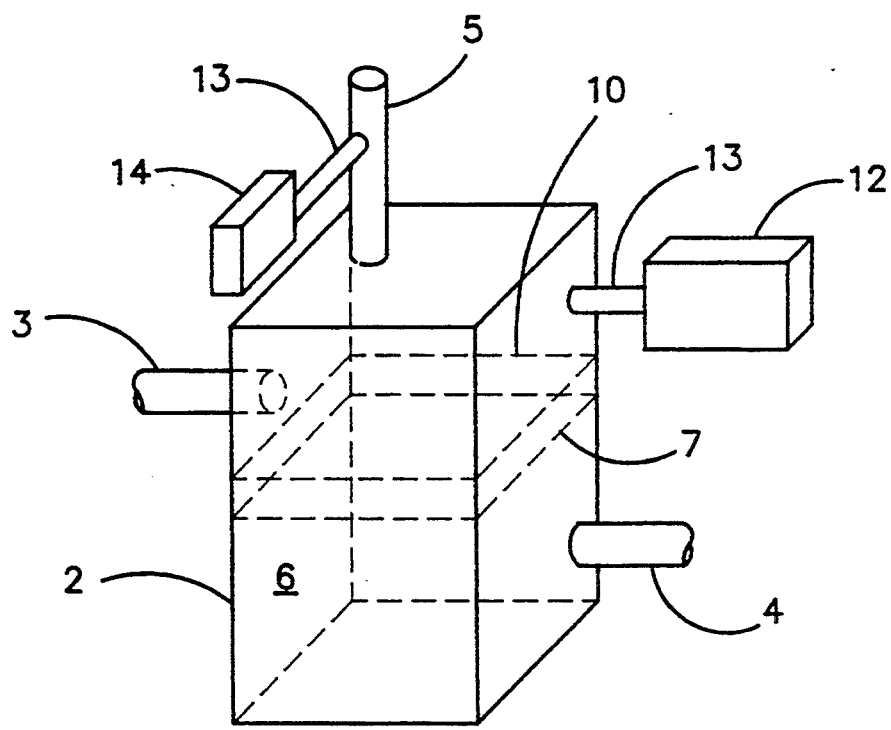
FIG. 2 is a perspective view of a lift station of the type used in Example 1.

In a sewer lift station handling about 3,500,000 gallons per day, similar to the one shown in FIG. 2, the wet well was 10 feet by 10 feet with a vapor space average height of 20 feet. The average hydrogen sulfide gas in solution was 2.0 ppm. Prior to installation of ozone equipment the wet well was vented through an 8-inch vent stack 5, 20 feet tall with a pressurized blower rated at 2400 cubic feet per minute. Hydrogen sulfide levels in solution were controlled at 1.0 ppm by addition of 50% of hydrogen peroxide solution to the inlet line 3 about 500 feet upstream of the station. Vapor hydrogen sulfide was about 30 to 40 ppm. There was a heavy slime biofilm on the wet walls and ceiling. Heavy odors were reported in the area on a daily basis.

An ozone generator capable of producing 10 ppm of ozone in 150 cubic feet per minute (CFM) of air was employed. Due to the construction of the wet well the ozonated air was introduced through the side of the well by a first unit 12 via a 4-inch pvc pipe 13 approximately 6 feet below the top of the well. This allowed the inlet velocity to dissipate against the opposite wall without excessive stirring of the lower level. A second unit 14 producing 0.5 ppm ozone in 25 CFM was attached to the inlet of the vent stack 5. Within three days odors were no longer reported in the vicinity. The hydrogen peroxide addition was reduced to zero over a one-month period. Hydrogen sulfide levels in the wet well declined to 10 ppm within one week and to 1.0 or less within one month when hydrogen peroxide use was suspended. When the wet well was inspected at 6 months, there was no slime biofilm present, and the walls were clear and dry. The absence of biofilm revealed extensive structural damage, so the station was taken offline and rebuilt. Ozone application at about half the original dosage was started when the station was restarted. After 15 months of operation the station was inspected again. There was no biofilm slim and the walls were clean, dry and like new. During the entire period of operation, there were no odor reports of any kind. This test was conducted on another similar lift station with substantially the same results.

EXAMPLE 2

Figure 3:
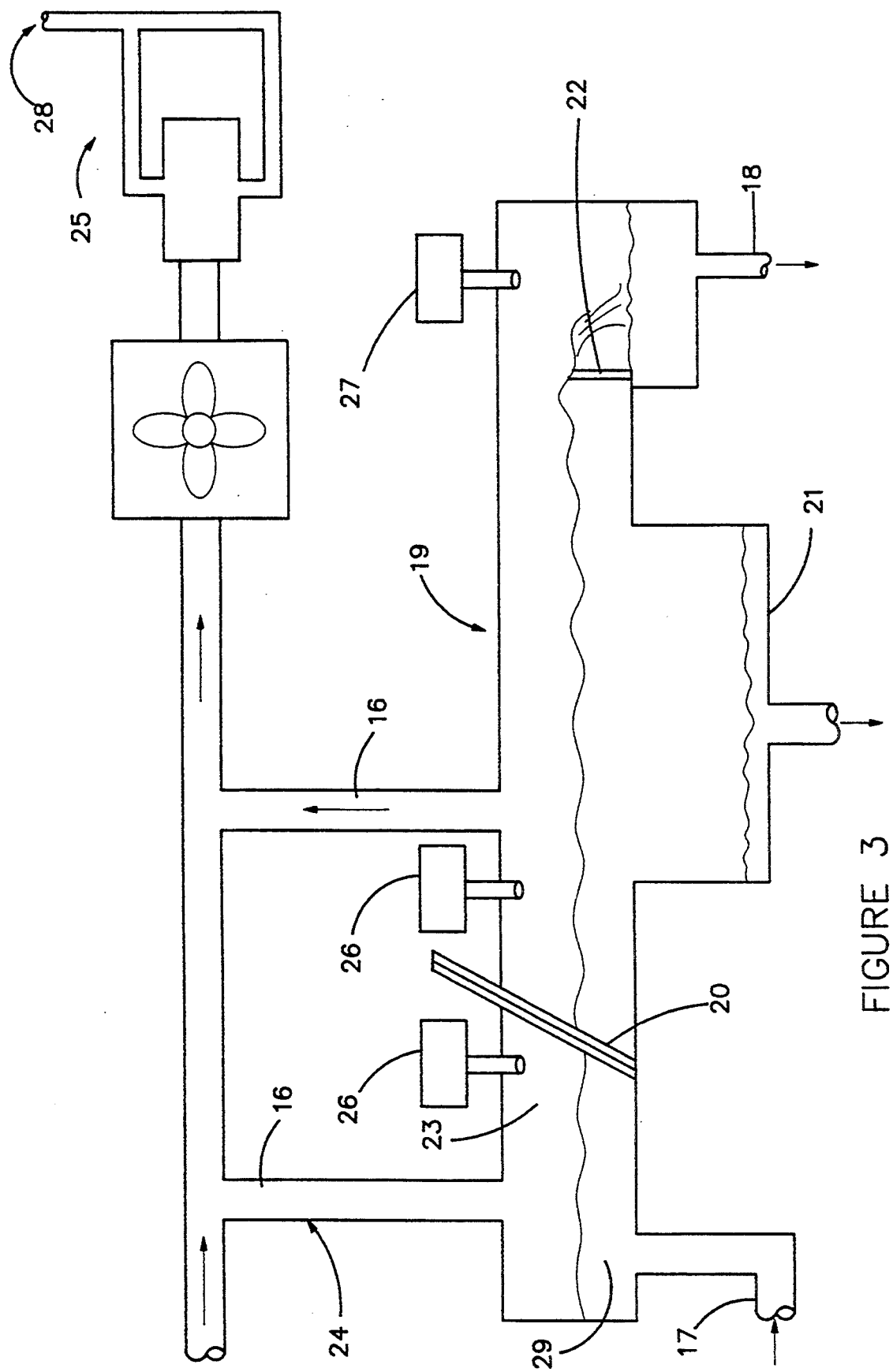
FIG. 3 is a sectional view of a typical waste water treatment facility of the type used in Example 2, depicting possible locations for the introduction of ozonated air in accordance with the invention.

Another test was conducted on the pretreatment section of a waste water treatment facility similar to that shown in FIG. 3. The pretreatment section of the 38 million gallon per day (MGD) plant consisted of flow splitting through mechanical bar screens 20, then grit removal in two parallel setting chambers 21 before exit over flow weirs 22 to an oxygen reactor section.

Prior to ozone use, over 6000 pounds per day of hydrogen peroxide was added at about 2000 feet upstream of the plant. Although hydrogen sulfide levels in solution were under 5 ppm, levels in the vapor space 23 in the screen section were about 80 to 100 ppm, the grit chambers 40 to 60 ppm, and 600 to 800 ppm on the weir section. The vapor space had a negative pressure vent system 24 to a wet scrubber system 25. Hydrogen sulfides from the scrubber were from 5 to 20 ppm. Odors were in the immediate area with hydrogen sulfide levels often over 8 ppm in the pretreatment building. Heavy biofilm was noted throughout the structure.

Two ozonators 26,27 were installed, each capable of 250 CFM of air containing 200 ppm of ozone. The production of one unit 26 was split into two parts and ozone was introduced in the flow inlet area by the bar screens 20. The production of the other unit 27 was split into four parts and injected at the weirs 22. Within seven days, the odors were gone from the area and readings of 0.0 hydrogen sulfide were reported at the scrubber exhaust 28. Ambient levels of hydrogen sulfide in the building were below detectable limits. Readings at the inlet 29 and bar screen vapor space 23 were 20 to 30 ppm, 10 to 15 ppm at the grit chambers 21, and 250 ppm at the weirs 22.

After two weeks, hydrogen peroxide addition was gradually reduced over a period of one month. After one month with hydrogen peroxide addition at 50% of initial amounts, the readings remained unchanged. The hydrogen peroxide was then reduced an additional 50% to 25% of original levels. Solution hydrogen sulfide remained below 5 ppm. The readings at the inlet 29 were reduced to 40 ppm, while the readings at the bar screens 20 dropped to 20 ppm, the grit chambers 21 to 5 to 10 ppm, and the weirs 22 to 100 ppm. Virtually all biofilm was removed and several areas of severe structural damage were noted.

Although the present invention has been described in terms of specific embodiments, it is anticipated that alterations and modifications thereof will no doubt become apparent to those skilled in the art. It is therefore intended that the following claims be interpreted as covering all such alterations and modifications as fall within the true spirit and scope of the invention.

I claim:

1. In a lift station of a sewage treatment system, said lift station comprising an enclosure for waste water, said enclosure including a holding tank, an inlet line, an outlet line, and a vent line; a method of removing noxious odors and preventing erosion within said enclosure, comprising the step of introducing into a vapor space above the level of said waste water in said enclosure, a low turbulence flow of ozonated air in sufficient volume of said ozonated air to form a blanket above said level of said waste water in said enclosure and in an ozone concentration effective to prevent the formation of a biofilm, said introduction of ozonated air further being of a sufficient volume and ozone concentration to substantially react with malodorous gases present in said enclosure without causing substantial erosion of said enclosure by said ozonated air.

2. The method according to claim 1, wherein the concentration of ozone in said ozonated air is between 0.05 ppm and 200 ppm.

3. The method according to claim 2, wherein the concentration of ozone in said ozonated air is between 0.05 ppm and 5.0 ppm.

4. The method according to claim 1, wherein the volume of said ozonated air introduced into said enclosure is less than 20% of the volume of said vapor space.

5. The method according to claim 1, wherein said ozonated air is introduced at a level adjacent to the level of said waste water.

6. The method according to claim 1, wherein said ozonated air is introduced continuously.

7. The method according to claim 1, wherein said blanket of ozone is formed immediately above the level of said waste water.

8. In a lift station of a sewage treatment system, said lift station comprising an enclosure for waste water, said enclosure including a holding tank, an inlet line, an outlet line, and a vent line; an improved enclosure for waste water, the improvement comprising means operatively attached to said enclosure for introducing into a vapor space above the level of said waste water in said enclosure, a low turbulence flow of ozonated air in sufficient volume of said ozonated air to form a blanket above said level of said waste water in said enclosure and in an ozone concentration effective to prevent the formation of a biofilm, said ozone introducing means further providing ozonated air of a sufficient volume and ozone concentration to substantially react with malodorous gases present in said enclosure without causing substantial erosion of said enclosure by said ozonated air.

9. The improved enclosure for waste water according to claim 8, wherein the ozone introducing means produces concentrations of ozone in said ozonated air between 0.05 ppm and 200 ppm.

10. The improved enclosure for waste water according to claim 9, wherein the ozone introducing means produces concentrations of ozone in said ozonated air between 0.05 ppm and 5.0 ppm.

11. The improved enclosure for waste water according to claim 8, wherein the volume of said ozonated air introduced by the ozone introducing means into said enclosure is less than 20% of the volume of said vapor space.

12. The improved enclosure for waste water according to claim 8, wherein the ozone introducing means introduces said ozonated air at a level adjacent to the level of said waste water.

13. The improved enclosure for waste water according to claim 8, wherein said ozone introducing means is continuous.

* * * * *